(12) United States Patent
Countz

(10) Patent No.: US 7,285,694 B2
(45) Date of Patent: Oct. 23, 2007

(54) THERMOBARIC MOLECULAR FRACTIONATION

(75) Inventor: John W. Countz, Wichita, KS (US)

(73) Assignee: Cargill, Incorporated, Wayzata, MN (US)

( * ) Notice: Subject to any disclaimer, the term of this patent is extended or adjusted under 35 U.S.C. 154(b) by 648 days.

(21) Appl. No.: 10/776,041

(22) Filed: Feb. 11, 2004

(65) Prior Publication Data

US 2005/0177013 A1    Aug. 11, 2005

(51) Int. Cl.
*C07C 1/00* (2006.01)
*B01J 8/18* (2006.01)

(52) U.S. Cl. .................. 585/240; 585/418; 422/139; 422/141; 422/144; 422/146; 210/603; 208/400; 208/415; 208/431

(58) Field of Classification Search ............... 585/240, 585/418; 422/139, 141, 144, 146; 210/603; 208/400, 415, 431
See application file for complete search history.

(56) References Cited

U.S. PATENT DOCUMENTS

| | | | |
|---|---|---|---|
| 4,102,938 A | | 7/1978 | Rao |
| 4,289,625 A | * | 9/1981 | Tarman et al. ............ 210/603 |
| 4,536,584 A | | 8/1985 | Eskamani et al. |
| 4,592,762 A | | 6/1986 | Babu et al. |
| 5,651,890 A | * | 7/1997 | Trost ....................... 210/603 |
| 2003/0100807 A1 | | 5/2003 | Shabtai et al. |

* cited by examiner

*Primary Examiner*—Glenn Caldarola
*Assistant Examiner*—Prem C. Singh

(57) ABSTRACT

Systems and methods for converting organic material into commercially viable products, such as burnable low sulfur engine fuels. The system of the present invention includes an anaerobic stripping reactor for processing organic materials into a bio-softened slurry, a thermobaric cracking chamber and expansion/separation tank for converting the bio-softened slurry into products, and a hydrocarbon separation system for separating the various products. An interfusion system can be provided that selectively combines various of the products to create fuels, such as diesel or gasoline. In one embodiment, the thermobaric cracking chamber operates approximately in the ranges of 350 to 600° F. and 400 to 1,200 psig. In a specific embodiment, the anaerobic stripping reactor is segregated into three areas to create buffer zones both into and out of the anaerobic stripping reactor, thus isolating a main portion of the organic material from reactive shocks. Varying the organic material input into the system, and/or the temperature and/or pressure of the thermobaric cracking chamber and/or the dwell time of the organic material in the thermobaric cracking chamber allows the end product of the system to be manipulated and controlled.

26 Claims, 6 Drawing Sheets

THERMOBARIC MOLECULAR FRACTIONATION

FIELD OF THE INVENTION

The present invention relates generally to a system and method for converting organic materials into hydrocarbon monomer chains. More specifically, the present invention relates to a system and method for converting bio-feedstock into commercially viable products including fuels, such as crude oil, diesel, gasoline, and other fuel or petroleum products, and for controlling and manipulating the end product produced.

BACKGROUND OF THE INVENTION

Bio-feedstock and similar waste are often disposed of by incineration or dumping in a landfill. These and other disposal systems involve costs and dispose of the waste without providing any further product. A movement has been made towards converting the bio-feedstock and similar waste to a useful product.

Fossil fuels have been thought of as non-renewable resources insofar as they are produced through the decomposition of plant and animal matter and subsequent compression and geo-thermal heating of the decomposed plant and animal matter over time. The point at which large pockets of decomposed organic matter are subjected to the heat and pressure necessary to achieve molecular breakdown to form crude oil is arbitrary and takes thousands or millions of years.

Thermobaric molecular fractionation is a super accelerated process for producing crude oils, which are similar in composition to the fossil crude oils created in nature. Bio-feedstock cracking units are currently available for breaking down biomass into crude oil. While current bio-feedstock cracking units have some success in converting biomass into crude oil, it is not possible to control the process of the bio-feedstock cracking units in order to dictate specific end products. Further, the bio-feedstock cracking units currently available do not typically yield a commercially viable fuel. Consequently, these units frequently represent a significant financial investment with marginal or risky returns on the investment.

Therefore, there remains a need for a bio-feedstock cracking system that is capable of converting organic materials into commercially viable products and manipulating the products produced.

BRIEF SUMMARY OF THE INVENTION

The present invention provides a system and method for converting organic materials, such as bio-feedstock or other biomasses, into commercially viable products. The system and method use thermobaric molecular fractionation to convert (or fraction) biomass containing organic macromolecules or other organic materials into primarily hydrocarbon monomer chains (crude oil) and allows specific manipulation of the thermobaric molecular fractionation process to control the end products produced. Using the system and method of the present invention, the fractionation point can be substantially controlled.

At about 3200 psig and 705° F, water enters the super-critical state and becomes $scH_2O$ (super-critical $H_2O$). $scH_2O$ is a super organic solvent that breaks down organic compounds to their base elements (carbon, nitrogen, etc.). To convert biomass to crude oil, the molecular fractionation of the biomass is done to a point less than to the base elements. Therefore, $scH_2O$ is not used. Instead, temperatures in the range of approximately 350 to 600° F and pressures in the range of approximately 400-1200 psig are used to limit the molecular fractionation of the organic compounds. By limiting the temperatures, pressures and dwell time (cook time) of the thermobaric molecular fractionation process, the fractionation of the organic materials is limited and controlled, driving the carbon chain breaks desired and allowing the end product of the molecular fractionation of the organic material to be manipulated.

The system of the present invention generally comprises four components: a first component for automated control and monitoring of the process, a second component for converting the organic materials into an anaerobically softened and sulfur stripped organic slurry feedstock; a third component for converting the softened feedstock into a plurality of products; and a fourth component for separating the plurality of products. A fifth component may also be provided with the system for selectively combining various of the plurality of products to produce fuels or other desirable products. For ease of reference, the first component is referred to as a SCADA (Supervisory Control And Data Acquisition) System, the second component is referred to as an anaerobic stripping reactor, the third component is referred to as a thermobaric cracking chamber, the fourth component is referred to as a hydrocarbon separation system, and the optional fifth component is referred to as a distribution, interfusion and storage system. These terms are used as reference terms only and are not intended to be descriptive or limiting.

The system process controller or SCADA may be used to automate the thermobaric molecular fractionation of the organic materials. The system process controller may operate the system and/or determine adjustments to the variables (e.g., temperature, pressure, or dwell time) to produce desired end products.

In one embodiment, the anaerobic stripping reactor or preprocessor includes first, second and third areas. The first area, the new bio-slurry area, receives the organic material, seeds it with bacteria and allows it to stabilize. The first area then conveys the organic slurry to the second area. In the second area, the meta-stable area, the organic material is bio-actively softened. Preferably, the second area includes bioactive anaerobic bacteria, primarily methogens, which react with the organic material or slurry to produce one or more burnable gases, such as methane, and pull out sulfur through hydrogen sulfide gas production. Sulfur rich gases intermixed with the burnable gases may be removed by a sulfur-removing device such as an iron sponge by passing the burnable gases through the sulfur-removing device. The burnable fuels can then be used, for example in firing remaining system processes. Pulling out methane gas and stripping out sulfur from the organic material or bio-feedstock softens the organic slurry. This process also naturally breaks down starches, sugars, and proteins during gas production while leaving heavier hydrocarbon chains ideal for petroleum product production. Other bacteria of special design may be used to break down extra heavy carbon chains (e.g. more than $C_{26}$). Carbon chains of approximately $C_6$ to $C_{26}$ are desirable for diesel, kerosene, gasoline, naphthalene, and other petroleum products. Extra long carbon chains can be recycled for additional processing. The burnable gases may be collected by a pump and used as fuels to fire the remaining system processes, for example, to heat the cracking chamber or other devices in the system. The third area of the anaerobic stripping reactor, the batch ready area, receives the bio-actively softened slurry from the second area and conveys a small portion of the fully bio-activated slurry back to the first area, the new bio-slurry area, to perpetuate the reaction while the majority of the slurry proceeds to the thermobaric cracking chamber for processing.

The thermobaric molecular fractionation ("TMF") process occurs in two stages. The first stage occurs inside the thermobaric cracking chamber and is a function of the water within the bio-slurry becoming an efficient organic solvent at near supercritical temperatures and/or pressures. The second state of molecular fractionation is affected by the immediate oxidation effect of releasing the contents of the thermobaric cracking chamber into an expansion/separation tank. This oxidation effect is known in the art as near super-critical oxidation.

Fractionating (or cracking) of the organic macromolecule bonds refers to the breaking down of the organic macromolecules into orphaned hydrocarbon monomer chains. In one embodiment, the thermobaric cracking chamber operates at a temperature of from approximately 350 to approximately 600° F. and a pressure of from approximately 400 to approximately 1,200 psig. The thermobaric cracking chamber thus super-heats the bio-slurry. The thermobaric cracking chamber may be coupled to a pressure intensifier such as a multi-stage high pressure air compressor. The temperature and/or pressure and/or dwell time in the molecular fractionation tank may be selected and controlled. Specific temperature, pressure and dwell time combinations will produce specific carbon chain fractionations in specific feedstocks. Thus, by adjusting one ore more of the variables, temperature, pressure, dwell time, or organic matter, the end products can be manipulated. The thermobaric molecular fractionation process produces a plurality of products (primarily a plurality of carbon chain fractionations) that are commingled in the thermobaric cracking chamber and the expansion/settling tank.

The hydrocarbon separation tank receives the superheated slurry at approximately the end of the specified dwell or cook time. The volumetric size of the expansion/settling tank is such that it allows the superheated slurry to expand rapidly, causing a significant drop in atmospheric pressure and temperature. As the superheated slurry expands and cools, it is exposed to atmospheric oxygen, causing further molecular bond fractions by rapid acceleration and oxidation of free ionic compounds, thus causing the formation of more hydrocarbon monomers and preventing their reformation into undesirable complex compounds through condensation. In one embodiment, the expansion/settling tank is shaped such that it forms a vertical column at its base, which is approximately equal to the volume of the thermobaric cracking chamber. The cooled condensate of the released superheated slurry travels to, due to gravity, and is received by, the vertical column. The superheated slurry is then allowed to cool, settle and separate into its various phases based upon specific gravities (oil over water over solids, etc.). The oil, water and solids are then separated by pumping the majority oil from the top fraction into the hydrocarbon separation system and passing the water/solids through a screen filter, gasification separator and purification system common in the art. Solids may be land-filled, pyrolized or otherwise further processed according to their nature. The filtered water may be reused inside or outside of the processing stream or simply returned to nature.

The hydrocarbon separation system collects and separates the products produced in the thermobaric cracking chamber. A hydrocarbon monomer separation process can be used to separate specific hydrocarbon alkanes and alkenes based upon their respective boiling points (fractional distillation tower). After the specific products have been separated out, a distribution, interfusion and storage system may be provided to selectively combine or blend several of the products to generate fuels or other commercially viable products.

Other features, objects, and advantages of the present invention are apparent in the detailed description that follows. It should be understood, however, that the detailed description, while indicating preferred embodiments of the invention, are given by way of illustration only, not limitation. Various changes and modifications within the spirit and scope of the invention will become apparent to those skilled in the art from the detailed description.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views. These drawings are provided for illustration, not limitation.

DETAILED DESCRIPTION

The present invention provides a system and method for converting organic materials, such as bio-feedstocks or other biomasses, into commercially viable products, such as diesel, gasoline and other burnable low sulfur engine fuels. Other valuable by-products such as alkenes for plastics production, useful solvents, octane boosters, nitrogen, carbon and other can also produced thereby. The system and method of the present invention use thermobaric molecular fractionation to convert biomass or other organic materials into hydrocarbon monomer chains (crude oil). More specifically, the system and method of the present invention allow the end product of the molecular fractionation of the organic materials to be manipulated and controlled.

Figure 1:
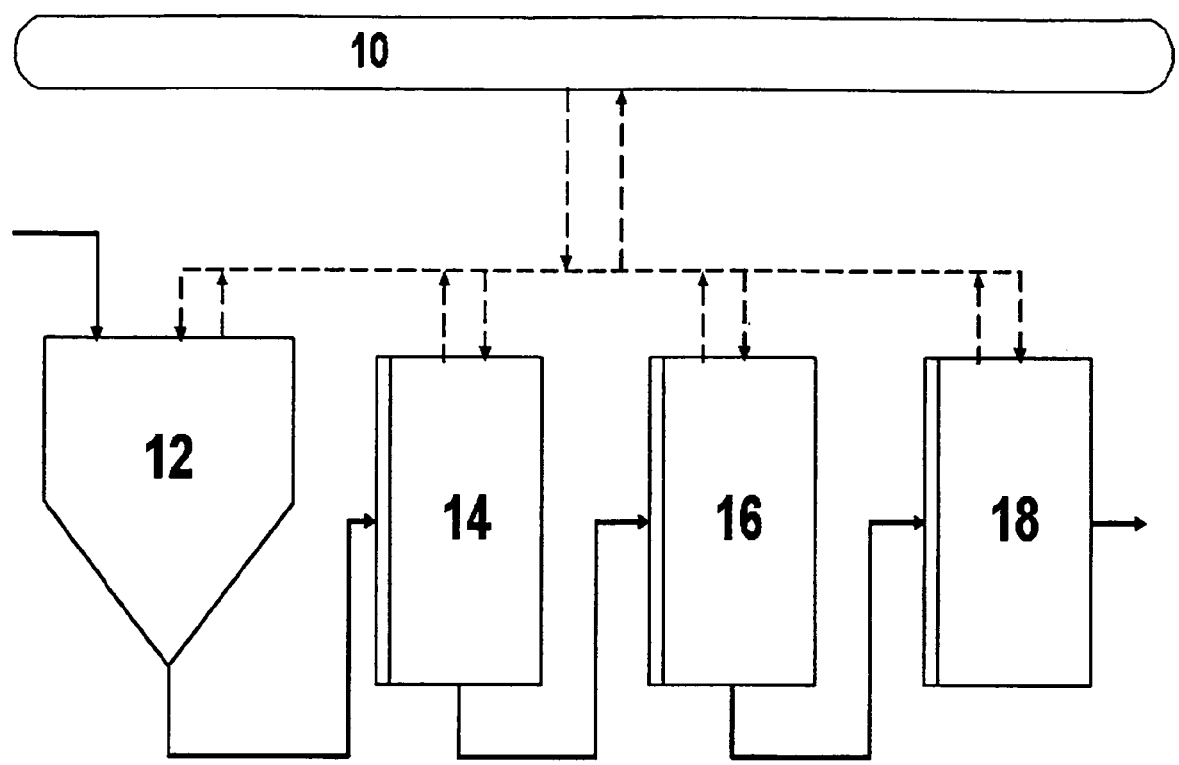
FIG. 1 illustrates a block diagram of an exemplary system for petroleum crude oil synthesis from bio-feedstocks in accordance with one embodiment of the present invention.

As seen in FIG. 1, the system of the present invention generally comprises four components: a first component 10 for automated control and monitoring of the process, a second component 12 for converting the organic materials into an anaerobically softened and sulfur stripped organic slurry feedstock; a third component 14 for converting the softened feedstock into a plurality of products; and a fourth component 16 for separating the plurality of products. As shown, a fifth component 18 may also be provided with the system for selectively combining the plurality of products to produce fuels or other desirable products. For ease of reference, the first component 10 is referred to as a SCADA (Supervisory Control And Data Acquisition) system, the second component 12 is referred to as an anaerobic stripping reactor, the third component 14 is referred to as a thermobaric cracking chamber with an expansion/settling tank, then fourth component 16 is referred to as a hydrocarbon separation system, and the optional fifth component is referred to as a hydrocarbon distribution, interfusion and storage system. These terms are used as reference terms only and are not intended to be descriptive or limiting. While the fifth component 18, the hydrocarbon distribution, interfusion, and storage system component is shown in FIG. 1, it is an optional component and need not be provided with the present invention.

The variables which can be adjusted in accordance with the present invention to manipulate the end products produced from the organic material include temperature, pressure, dwell time (cook time) and organic material. The present invention breaks the organic macromolecular compounds of the organic material into carbon monomer chains (primarily hydrocarbon chains) of a variety of sizes. These carbon or hydrocarbon monomer chains can be selectively combined to produce blended fuels such as diesel fuels, or further cracked to produce gasoline, or other fuel/petroleum products. By varying the organic material, the dwell time, the temperature, or the pressure, the end product can be manipulated and controlled. The SCADA system 10, or system process controller, may be used for operating the system and/or for determining or optimizing adjustments to the variables to produce a desired end product.

The organic materials suitable for the present invention include any organic macromolecular compounds. These macromolecules can be naturally occurring macromolecules, such as are present in, but not limited to, proteins, starches, cellulose, or fats. They can also be synthetic macromolecules. Suitable organic materials include wastes, garbage, or bio-feedstocks derived from animals, plants or other organisms. Generally speaking, materials high in animal or vegetable fats are better suited for thermobaric molecular fractionation using the present invention as they produce higher hydrocarbon yields. The organic materials are fractionated in the thermobaric cracking chamber, where temperature, pressure and/or dwell time may be varied, as will be discussed later.

Figure 2:
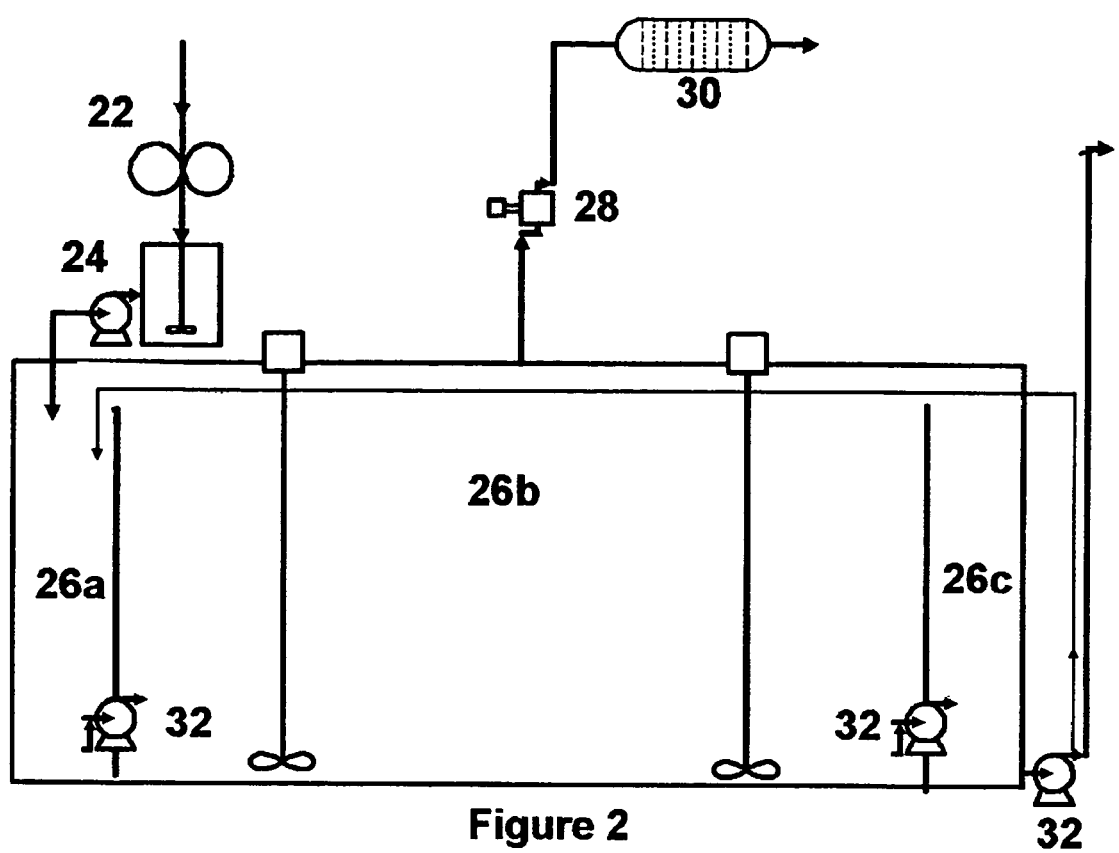
FIG. 2 illustrates a diagram of an anaerobic stripping reactor in accordance with one embodiment of the present invention.

FIG. 2 diagrams an anaerobic stripping reactor 12 for use in the present invention. The anaerobic stripping reactor uses a maceration process to pulverize and liquefy the incoming organic feedstock into a slurry, suitable for efficient anaerobic reaction/digestion. The anaerobic process of the anaerobic stripping reactor produces burnable natural gases such as methane and also causes a bio-sulfuric stripping process through the natural anaerobic production of hydrogen sulfide (H2S). The bio-sulfuric stripping process performs a threefold process: first, to preprocess the incoming organic material and biomass into a softened slurry which is more efficiently processed into petroleum products, second to produce a burnable natural gas fuel to power further process heat requirements of the system, and third to extract significant levels of sulfur which is not desirable in petroleum products. During the bio-sulfuric stripping process, bioactive anaerobic bacteria, primarily methogens, react with the organic material to produce burnable gases such as methane gas ($CH_4$). Another gas, hydrogen sulfide ($H_2S$), is anaerobically produced. The hydrogen sulfide efficiently removes or carries out sulfur from within the biomass slurry. Sulfur can be removed from the methane/hydrogen sulfide gas mix by passing the gas through a sulfur removing device such as an iron sponge. The burnable gases, such as methane, may then be used to fire the remaining system processes, for example, to heat the thermobaric cracking chamber or other devices in the system. The anaerobic stripping reactor 10 softens the organic material or bio-feedstock by breaking down starches, sugars, proteins and cellulose complexes, leaving behind the fatty hydrocarbon chains suitable for petro-chemical production. Other specially designed anaerobic bacteria may be used to target and break down extra heavy carbon chains (e.g. more than $C_{26}$). Carbon chains of approximately $C_6$ to $C_{26}$ are desirable for diesel, kerosene, gasoline, naphthalene, and other petroleum products. Long carbon chains can be recycled for additional processing or to make asphalt type products.

The bio-sulfuric stripping reactor 12 shown in FIG. 2 includes a roll mill 22, a pulverizer 24, a covered reactor tank 26 segregated into three areas 26a-26c, a scavenge pump 28, an iron sponge 30, and slurry transfer pumps 32 between the segregated tank areas 26a-26c and a slurry transfer pump 32 on the output of the process. Of course, it may not be necessary to include each of these components in the anaerobic stripping reactor 12.

The covered reactor tank 26 in the bio-sulfuric stripping reactor 12 is segregated into three areas: a first area, the new bio-slurry area 26a; a second area, the meta-stable area 26b; and a third area, the batch ready area 26c. Bioactive anaerobic bacteria, either natural or added, is present inside the reactor tanks and slurry. The scavenge pump 28 captures anaerobically produced gases, such as methane and hydrogen sulfide gas, and an iron sponge 30, or other sulfur removing device, removes or strips sulfur from the hydrogen sulfide/methane gas mixture.

The three-tank system of the bio-sulfuric stripping reactor 12 of the present invention seeks to isolate the main body or meta-stable area 26b from reactive shocks common to bio-reactor bacterial colonies caused by starvation or over feeding due to feedstock flow issues. Starvation and excessive feeding can cause potentially harmful pH swings that can kill the anaerobic bacteria. Isolation of the material in the meta-stable area 26b is enabled by providing buffer zones both into and out of the meta-stable area 26b. The new bio-slurry area 26a provides a buffer zone into the meta-stable area 26b and the batch ready area 26c provides a buffer zone out of the meta-stable area 26b. The new bio-slurry area 26a and the batch ready area 26c thus protect the health of the main population of bacteria.

Figure 3:
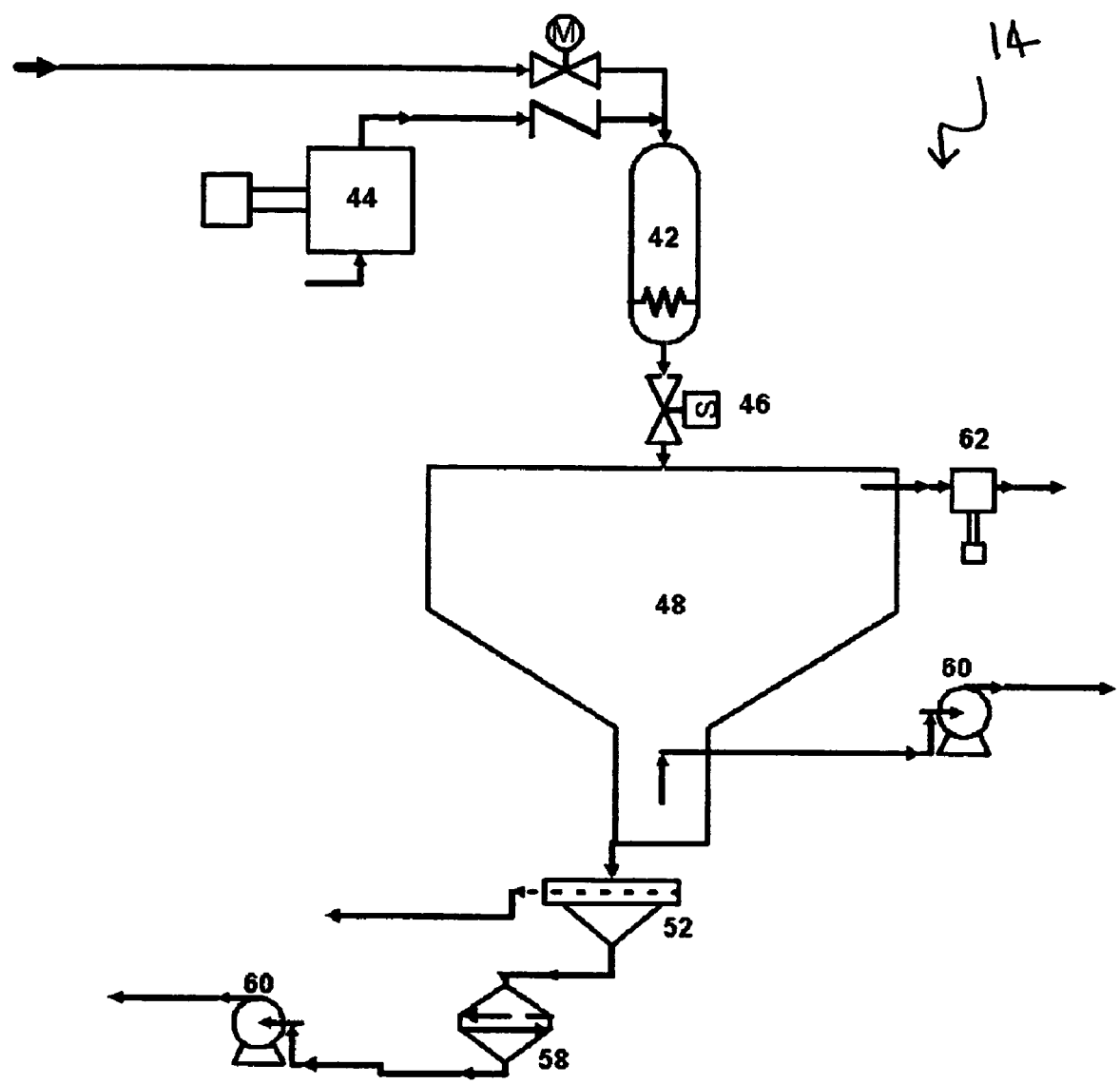
FIG. 3 illustrates a diagram of a thermobaric cracking chamber with an expansion/settling tank in accordance with one embodiment of the present invention.

FIG. 3 diagrams a thermobaric cracking chamber with an expansion/settling tank system 14 of the present invention. A thermobaric molecular fractionation ("TMF") process occurs partially within in the thermobaric cracking chamber, and partially within the expansion/settling tank. The thermobaric molecular fractionation process breaks down the slurry into numerous products. The thermobaric molecular fractionation process works on the basis of a process using water and pressure to affect an organic solvent which breaks down organic compounds. The TMF process then uses a phenomenon known in the art as near supercritical oxidation which adds oxygen to ionic compounds so as to inhibit the reformation or re-organization of complex compounds. Supercritical water ($scH_2O$) is achieved under approximately 3200 psig at 705° F. Supercritical water forms a super-organic solvent, which effectively breaks organic compounds down into elemental components. To convert biomass to crude oil, the molecular fractionation is done on the biomass to a point less than its base elements. Therefore, $scH_2O$ is not used. The process of the present invention thus uses relatively high temperature and pressure (less than that used to achieve $scH_2O$) to partially break down organic biomass into usable alkanes and alkenes. The near super critical oxidation further affects the destruction of organic macromolecule bonds. This organic solvent effect can be achieved at the 250-705° F. and 200-2000 psig range.

The preferred temperatures and pressures for the cracking chamber range from approximately 350 to 600° F and from approximately 400 to 1,200 psig, respectively. The preferred dwell or cook time is from approximately 15 to 60 minutes. These ranges are used to control the extent of the molecular fractionation of the organic materials. Other temperature and/or pressure and/or dwell time ranges that limit the molecular fractionation of the organic matter may also be employed. The given ranges are suitable for limiting the molecular fractionation of the organic matter, as they are less than the required temperature and pressure to produce $scH_2O$. Temperatures and pressures in the given ranges fractionate the organic matter to something more than base elements. By controlling the temperatures, pressures and dwell time, the fractionation of the organic materials can be limited and controlled and the end products manipulated. Thus, the present invention manipulates the specific reactions or fractionations to maximize the production of certain product ranges, on a batch by batch basis to optimize end product production, whether that end product is diesel, gasoline, or other petroleum product or chemical product.

The thermobaric cracking chamber with expansion/settling tank system 14 includes an inlet valve, a thermobaric cracking chamber 42, a pressure intensifier 44, a high speed release valve 46, an expansion/settling tank 48, a solids separation stage 52, a water filtration system 58, two liquid transfer pumps 60, and a gas scavenge pump 62.

The dwell time, temperature and pressure in the thermobaric cracking chamber 42 may be controlled or adjusted in any suitable manner. One suitable manner of controlling and adjusting the pressure in the thermobaric cracking chamber is to provide a pressure intensifier such as a multi-stage high pressure air compressor, operatively coupled to the thermobaric cracking chamber. When a specified temperature set-point is reached, the air compressor, or the pressure intensifier, is used to increase the tank pressure to a specified pressure set-point. The batch is allowed to cook at temperature and pressure for a defined dwell time. After the desired dwell time, or cook time, the superheated slurry is released into the expansion/settling tank where near super-critical oxidation occurs. The expansion/settling tank receives the superheated slurry at approximately the end of the specified dwell or cook time. The volumetric size of the expansion/settling tank is such that it allows the superheated slurry to expand rapidly causing a significant drop in atmospheric pressure and temperature. As the superheated slurry expands and cools it also rapidly oxidizes, causing further macromolecule bond fractions by acceleration and oxidizing free ionic compounds thus preventing their reformation into complex compounds. In one embodiment, the expansion/settling tank is shaped such that it forms a vertical column at its base, which is approximately equal to the volume of the thermobaric cracking chamber. The cooled condensate of the released superheated slurry travels to, due to gravity, and is received by, the vertical column. The superheated slurry (now largely a plurality of hydrocarbon products and water) is allowed to cool, settle, and separate into its various phases based upon specific gravities (oil over water over solids etc.). After phase separation (settling), the oils and gases are pumped off the top and the water and solids flushed out the bottom and separated. Solids may be pyrolized, and some burnable gases recaptured or otherwise recycled or land applied. The remaining water may be passed through a gasification/filtration system capable of removing suspended trace solids and oils and are either reused or returned to nature.

Figure 4:
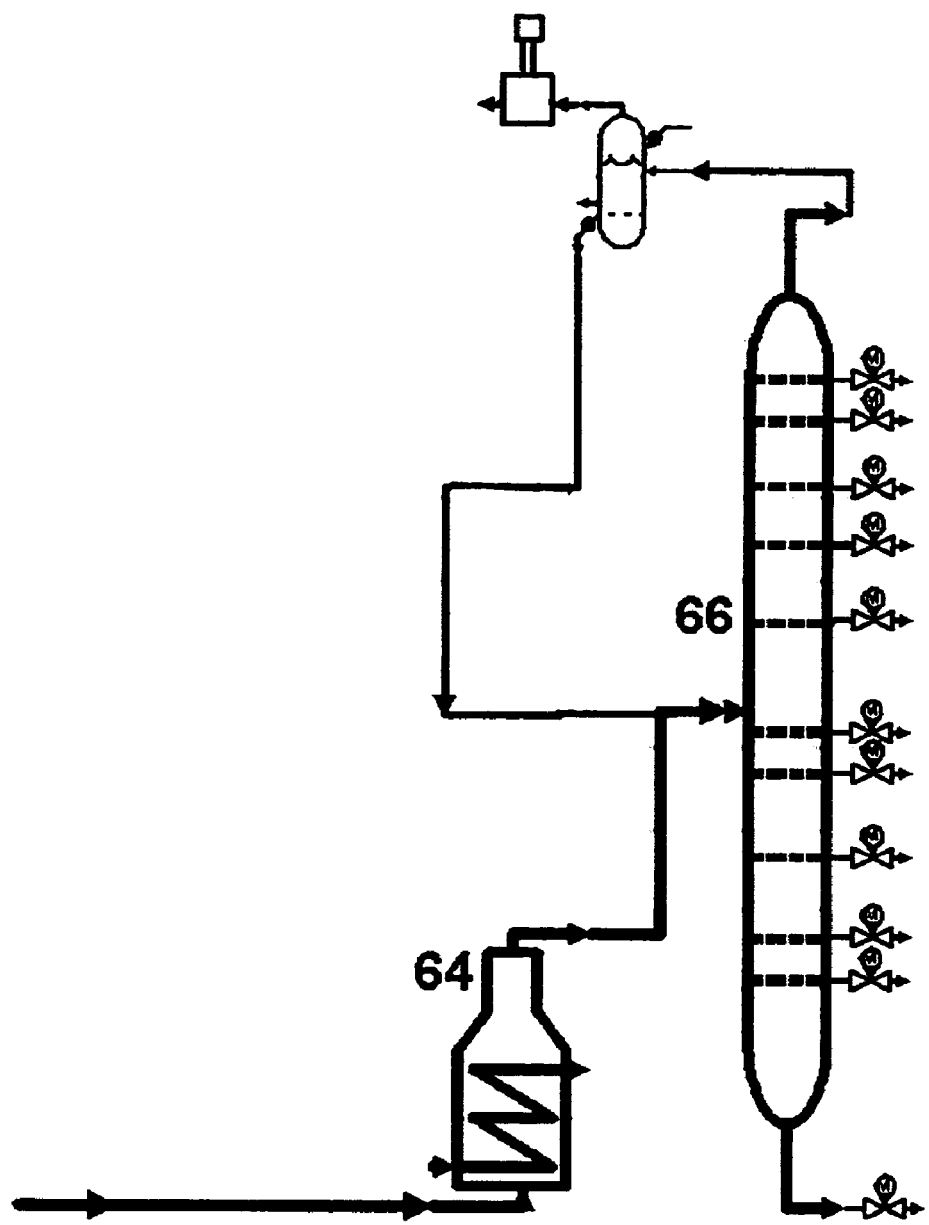
FIG. 4 illustrates a diagram of a hydrocarbon separation system in accordance with one embodiment of the present invention.

FIG. 4 diagrams a hydrocarbon separation system 16 of the present invention. The hydrocarbon separation system 16 collects and separates the products produced in the thermobaric cracking chamber 42. This separation may be done using a hycrocarbon separation process. The hydrocarbon separation system 16 is a fractional distillation system such as common to the petroleum refining industry. The fractional distillation column coupled with a reflux furnace of similar method common in the art separate specific hydrocarbon alkanes and alkenes based upon their respective boiling points. Alternately, other catalytic processes may be added as are common to the refining industry and are specific to producing a specific product or chemical. Illustration herein is offered as a base separation model and is not intended to in any way limit present refining options common in the art.

The hydrocarbon separation system 16 includes a distillate furnace 64, a fractional distillation column 66, and all of the normal valves and pumps associated with such a system. Fractional distillation of crude oil produces a number of usable fuels. These usable fuels include gases, gasoline, aviation oil, heating oil, and diesel oil. Further, naptha, grease and wax, and asphalt can be produced. Multiple distillation towers and furnaces may be used depending on the final product requirements and the degree of refining desired.

Figure 5:
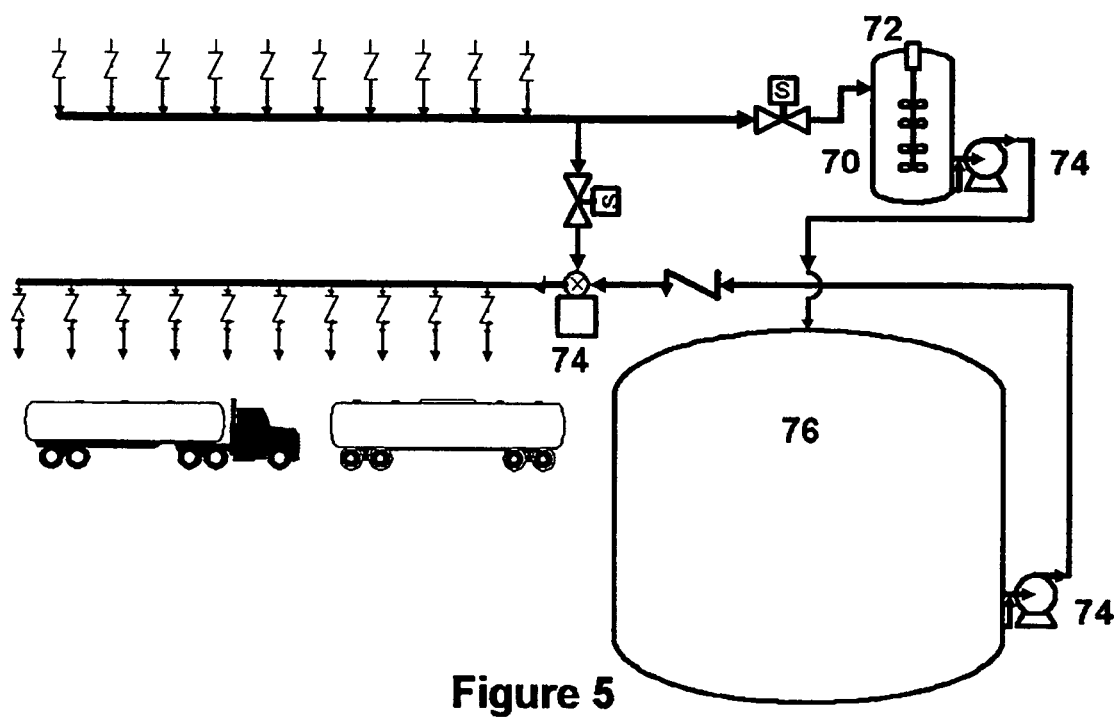
FIG. 5 illustrates a diagram of a hydrocarbon distribution, interfusion and storage system in accordance with one embodiment of the present invention.

FIG. 5 diagrams a hydrocarbon distribution, interfusion and storage system 18 of the present invention. The distribution, interfusion and storage system is an optional system that selectively combines the various products separated out in the hydrocarbon separation system to generate fuels or other commercially viable products. This can be done using a hydrocarbon interfusion (blending) and storage process.

The hydrocarbon distribution, interfusion and storage system 18 comprises a fuel blending tank 70, screw mixer 72, transfer pumps 74, and a main storage tank 76. The hydrocarbon distribution, interfusion and storage system 18 includes a series of valves, mixing pumps and tanks configured to blend and store the produced hydrocarbon products into commonly used blended fuels such as No. 1 and No. 2 diesel fuels while also providing a system of transferring other by-products into appropriate storage media such as rail cars or drums etc.

Figure 6:
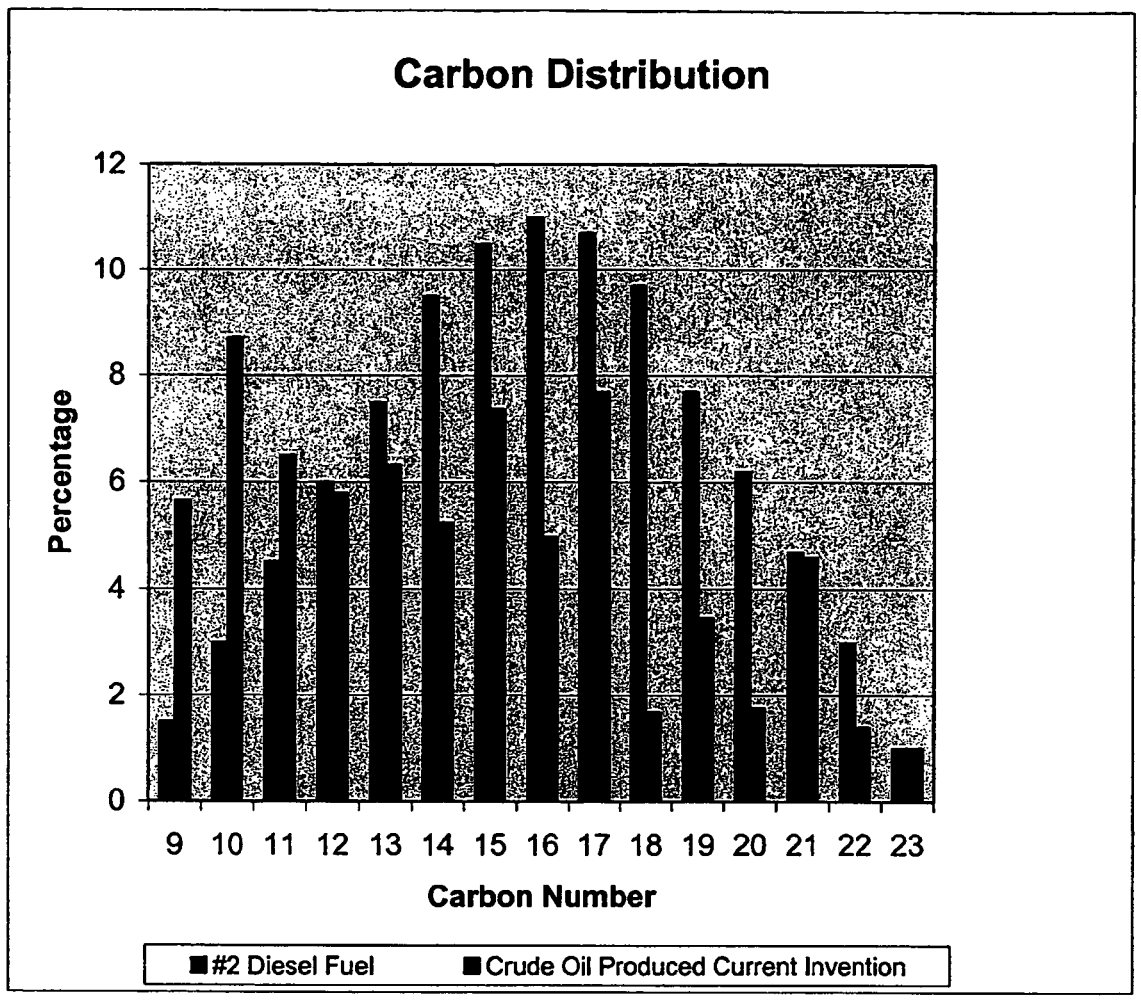
FIG. 6 compares the typical carbon number distribution of No. 2 diesel fuel to that of a starting biomass suitable for the present invention.

FIG. 6 compares the typical carbon number distribution of No. 2 diesel fuel to that of a starting biomass such as processed by the present invention.

A system process controller 10 or SCADA (shown in FIG. 1) may be used with the present invention for automating the thermobaric molecular fractionation of the organic materials. Such a system process controller includes a programmable logic controller and/or computer, a human machine interface (HMI), temperature and pressure and flow sensors, gas and fluid control valve actuators, motor starters, servo controls, stepper controls, safety circuits, diagnostic circuits and other components common in the art of industrial petroleum SCADA (Supervisory Control and Data Acquisition) systems. Software algorithms, which monitor and control the specific pressure/temperature/time processes to produce fractionation into specific carbon chains from the designated organic feedstocks, can also be included. The system process controller 10 may be a fully functional automated system controller containing algorithms capable of operating the entire system automatically as well as collecting statistical operational data, generating alarms, operating safety devices and all things common to automated industrial process control systems and their associated sensor/actuator devices. The system process controller can thus operate the system and/or determine adjustments to the variables to produce a desired end product. The system controller is capable of optimizing the produced product ranges on a batch by batch basis to fit distilled fuel production curves.

It is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Although the present invention has been described with reference to preferred embodiments, persons skilled in the art will recognize that changes may be made in form and detail without departing from the spirit and scope of the invention.

What is claimed is:

1. A process for breaking down macromolecular bonds within an organic material, comprising: converting the organic material into a bio-softened slurry in an anaerobic stripping reactor; heating in a thermobaric cracking chamber to a temperature of from about 350 degrees to about 600 degrees F and pressurizing the thermobaric cracking chamber to a pressure of from about 400 to about 1,200 psig to convert the bio-softened slurry into a superheated slurry comprising a plurality of products, the bio-softened slurry being housed in the thermobaric cracking chamber for a dwell time of from 20 to 60 minutes; and releasing the superheated slurry into an expansion/separation tank for phase separation of the superheated slurry.

2. The process of claim 1, wherein the thermobaric cracking chamber is coupled to a pressure intensifier to control the pressure in the chamber after a temperature set-point has been reached.

3. The process of claim 1, wherein the step of converting the organic material into a bio-softened slurry in an anaerobic stripping reactor softens the organic material.

4. The process of claim 1, wherein the anaerobic reactor is configured to isolate a main portion of the organic material from reactive shocks during the step of converting the organic material into a bio-softened slurry.

5. The process of claim 4, wherein the anaerobic stripping reactor includes a meta-stable area for housing a main portion of the organic material and a first buffer zone into the meta-stable area and a second buffer zone out of the meta-stable area.

6. The process of claim 1, wherein the anaerobic stripping reactor includes a first compartment, a second compartment, and a third compartment, the first compartment receiving the organic material, preconditioning the organic material and conveying the organic material to the second compartment, the second compartment being the main compartment where conversion of organic material into bio-softened slurry takes place, and the third compartment receiving the bio-softened slurry from the second compartment and conveying the bio-softened slurry to the thermobaric cracking chamber.

7. The process of claim 6, wherein a portion of the bio-softened slurry from the third compartment is conveyed to the first compartment to seed organic material entering the first compartment.

8. The process of claim 6, wherein the first compartment is a new bio-slurry area and functions as a buffer zone into the second compartment, the second compartment is a meta-stable area, and the third compartment is a batch ready area and functions as a buffer zone out of the second compartment.

9. The process of claim 8, wherein the third compartment further functions as a source for bio-active seeding feedback to the first compartment.

10. The process of claim 6, wherein the second compartment houses a majority of active bacteria which react with the organic material to produce one or more burnable gases.

11. The process of claim 6, wherein the third compartment provides sufficient bio-softened feedstock slurry to feed approximately one batch operation of the thermobaric cracking chamber.

12. The process of claim 1, wherein the anaerobic stripping reactor houses bioactive anaerobic bacteria, the bacteria reacting with the organic material to produce one or more burnable gases.

13. The process of claim 1, wherein the step of converting the organic material into a bio-softened slurry is performed using a bio-sulfuric stripping process that preprocesses the organic material into a slurry and produce burnable gases through active bacterial breakdown of the slurry.

14. The process of claim 13, further including the step of extracting the one or more burnable gases from the anaerobic stripping reactor.

15. The process of claim 14, wherein the anaerobic stripping reactor is coupled to a pump for extracting the one or more burnable gases from the anaerobic stripping reactor.

16. The process of claim 15, further including the step of using the one or more burnable gases extracted by the pump to power the thermobaric cracking chamber.

17. The process of claim 14, further including the step of removing sulfur from the one or more burnable gases.

18. The process of claim 17, wherein a scavenge pump is coupled to a sulfur removing device for removing the sulfur from the one or more burnable gases.

19. The process of claim 17, wherein the sulfur removing device is an iron sponge.

20. The process of claim 13, wherein the one or more burnable gases include methane.

21. The process of claim 1, further including the step of separating the plurality of products.

22. The process of claim 21, wherein the step of separating the plurality of products is done using a hydrocarbon separation process.

23. The process of claim 21, further including the step of selectively combining the plurality of products into a fuel product.

24. The process of claim 1, further including the step of selectively combining the plurality of products into a fuel product.

25. The process of claim 24, wherein the step of selectively combining the plurality of products is done using a hydrocarbon distribution, interfusion and storage process.

26. The process of claim 1, further including the step of adjusting the organic material, the pressure or the temperature of the thermobaric cracking chamber to produce a desired end product.

* * * * *